United States Patent [19]

von Braun

[11] 4,093,905
[45] June 6, 1978

[54] STEPPING MOTOR USING EXTENDED DRIVE PULSES

[75] Inventor: Leopold von Braun, Chicago, Ill.

[73] Assignee: Teletype Corporation, Skokie, Ill.

[21] Appl. No.: 691,678

[22] Filed: June 1, 1976

[51] Int. Cl.² .............................................. H02K 37/00
[52] U.S. Cl. .................................................. 318/696
[58] Field of Search ........................ 318/138, 685, 696

[56] References Cited

U.S. PATENT DOCUMENTS

| 3,385,984 | 5/1968 | O'Regan | 318/696 X |
| 3,445,741 | 5/1969 | Gerber | 318/696 |
| 3,626,269 | 12/1971 | Stanley | 318/696 |
| 3,965,406 | 6/1976 | Yablonski | 318/696 |

*Primary Examiner*—Gene Z. Rubinson
*Attorney, Agent, or Firm*—W. G. Dosse; J. C. Albrecht

[57] ABSTRACT

A stepping motor is driven with extended pulses producing an effective excitation intermediate to the single phase and the dual phase operations. The unique drive circuit creates a series of drive pulses for each motor phase so that each pulse slightly overlaps the drive pulse of the next adjacent phase. Thus, since each previous phase is still providing torque while the current in the next phase is being built up, the torque characteristics are improved, and the extended pulses are terminated before the subsequent phase is energized so that excessive power consumption is avoided. In closed loop systems, a fixed duration overlap provides the improved speed-torque characteristic at high speeds where the overlap is a large percentage of the drive pulse, while at lower speeds (such as when the motor is accelerating) where power consumption is greatest, the overlap is a smaller percentage of the drive pulse hence minimizing the increase in power consumption. This type of operation maximizes slew speed while conserving power consumption at low speeds. In open loop systems, using extended drive pulses increases the torque over that provided by single phase excitation, and the duration of the overlap may be adjusted so that large overlaps occur only where the torque needs are greatest (at times of acceleration, for example) while small overlaps occur where torque requirements are low (during constant speed operation, for example), thus minimizing the total overall power consumption.

14 Claims, 11 Drawing Figures

STEPPING MOTOR USING EXTENDED DRIVE PULSES

BACKGROUND OF THE INVENTION

This invention relates to stepping motors and more particularly to a method and drive circuitry for providing increased torque or speed with a minimum increase in power consumption.

Stepping motors are conventionally operated in one of two modes. Single phase operation involves exciting or energizing one of the windings (or phases) of the motor at a time, and stepping is accomplished by sequentially energizing adjacent phases. The alternative mode of operation is dual phase excitation in which two adjacent phases are energized at all times; in the dual phase operation one phase continues to produce torque throughout the first half of the next phase excitation so that maximum performances (torque) from a given size motor is achieved, but this is accomplished only at the expense of excessive power consumption. Thus while the single phase excitation consumes less power, more torque is produced by the dual phase excitation.

While high torque characteristics are of course desirable, it is of increasing importance to prevent unnecessary power consumption. Accordingly, it is the object of the present invention to provide improved stepping motor operation, and in particular to tailor the torque-speed characteristic of the stepping motor to the application while minimizing the power consumption.

It is a further object of the present invention to provide an improved stepping motor drive circuit which satisfies these requirements.

It is a still further object of the present invention to provide a stepping motor with efficient performance, especially to tailor the motor torque characteristics to the dynamic load requirements while minimizing the power supply requirements.

SUMMARY OF THE INVENTION

In accordance with the present invention a stepping motor drive circuit creates extended drive pulses to produce an extended single phase excitation. Each drive pulse overlaps the beginning of the successive drive pulse by a defined time, but the extended pulse is terminated before the subsequent drive pulse is commenced. Thus, the extended single phase excitation is not a dual phase operation. However, it does have some of the advantages of dual phase excitation without its disadvantages. In particular, higher torque is provided without excessive power consumption.

The extended single phase drive pulse generated in accordance with the present invention continues to provide torque while the current in the next energized phase is being built up. The resultant improvement in speed-torque characteristics of the motor is considerable, but since the simultaneous energization of two phases is terminated when no longer needed, the increase in power consumption is very small.

Stepping motors can be used in two types of operating systems: closed loop and open loop. In closed loop systems the speed and/or position is monitored by a sensor and a feedback signal controls the timing of the drive pulses, hence controlling the speed and the torque. In an open loop system there is no feedback and speed is established in response to the frequency of an external clock. In closed loop system using extended drive pulses the duration of the pulse extension (or overlap) may be of fixed duration so that as the speed increases, the relative percentage of the overlap increases, since the real time duration of the drive pulse decreases. This facilitates higher slew speeds (due to the large drive pulse overlap resulting in higher torque as the speed increases), but minimizes the power requirements at low (stepping) speeds where sufficient torque is available to accelerate the load even with a small drive pulse overlap. In open loop systems a fixed duration drive pulse overlap may be used to provide higher torque at all times. Alternatively, the overlap may be varied so that the large overlap is provided for acceleration and deceleration (where increased torque is necessary), but the overlap is made small for constant speed operation to conserve power by not energizing the adjacent phase unnecessarily.

The extended single phase excitation is therefore applicable to both open and closed loop systems although its specific implementation may differ slightly in the two systems. In addition, the length of the extended pulse may be selected for each particular application, whether the system is of the open or the closed loop variety.

DETAILED DESCRIPTION

Figure 1:
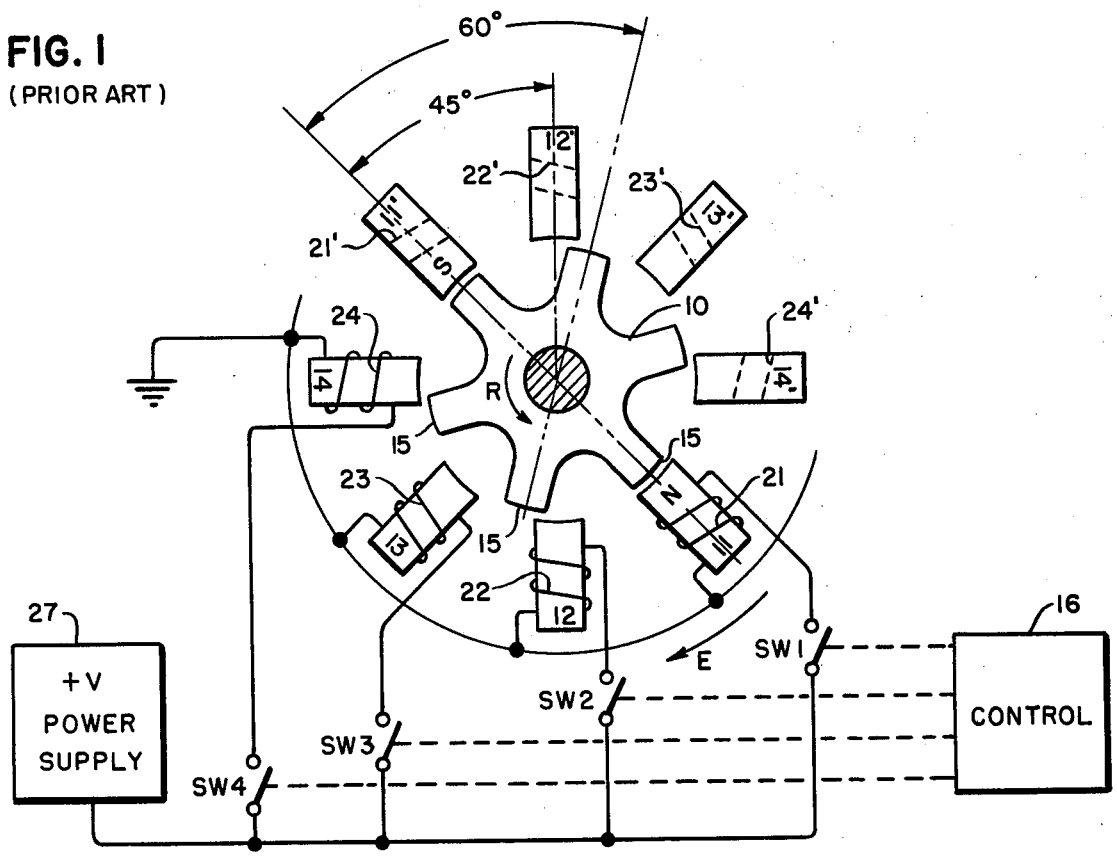
FIG. 1 is a schematic representation of a four-phase stepping motor of a generally conventional design.

The stepping motor to which this description is directed is assumed to be a variable reluctance motor with four stator phases. This motor structure is conventionally termed a four-phase motor and its phases are energized in sequence. If only one phase is energized at a time, it is normally referred to as a single phase operation; if two phases are energized all times, it is referred to as a dual phase operation. FIG. 1 is a generalized schematic representation of a conventional four-phase motor structure, but it is understood that the invention is not limited to that specific design and the invention is equally applicable to appropriate multiphase (other than, as well as, four-phase) motors of different design. In the embodiment shown each phase includes two poles (11 and 11', 12 and 12', 13 and 13', and 14 and 14', respectively). Each pole is provided with a winding or coil 21 through 24 and 21' through 24', and the coils on a given pole pair (constituting one phase) are energized together to provide a flux path through the magnetic rotor 10 (see for example the North, N, and South, S, designation on poles 11 and 11'). While the drawing is suitable for explaining the modes of energization found in the prior art and in accordance with the method of the present invention, it is representative of many varied designs and, as such, a specific connection of the windings on the primed poles is not shown. However, the switches SW-1 through SW-4 represent a mechanism for energizing the respective phases 1 through 4 (by connecting both interconnected coils on the pole pair; i.e. 21 and 21' for phase 1, 22 and 22' for phase 2, etc. to a power supply 27) in the sequence shown by the energize arrow E. Adjacent poles are separated by 45° and adjacent rotor faces 15 are separated by 60°. Therefore, as the phases 1 through 4 are energized sequentially the rotor 10 will advance or step 15° in the direction shown by the rotate arrow R as each successive phase is energized.

Figure 2:
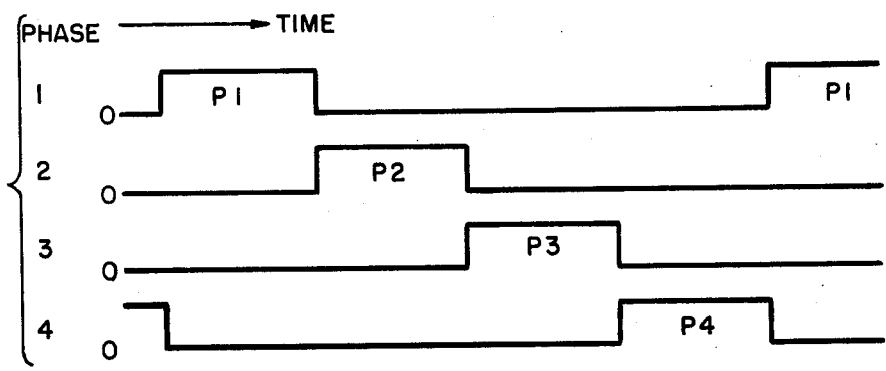
FIGS. 2 and 3 illustrate waveforms representative of the driving pulses used for conventional single phase and dual phase excitation.

FIG. 2 represents the drive waveforms when the motor of FIG. 1 is operating with single phase excitation. Drive pulse P1 (see the waveform for phase 1) is produced by the closure of switch SW-1 and this energizes coils 21 and 21'. Similarly, drive pulse P2 shown in the waveform for phase 2 (coils 22 and 22') is generated by the closure of switch SW-2, and drive pulses P3 and P4 energize the respective coils 23 and 23', and 24 and 24' upon closure of respective switches SW-3 and SW-4. A complete stepping cycle (four steps) requires energization of each of the stator coil pairs one after another, and thus, continuous stepping requires the sequence of the four drive pulses P1, P2, P3, and P4 to be repeated as many times as desired. This is a conventional operation and, as is well-known, the greatest torque requirements occur at acceleration and deceleration of inertial loads.

Figure 3:
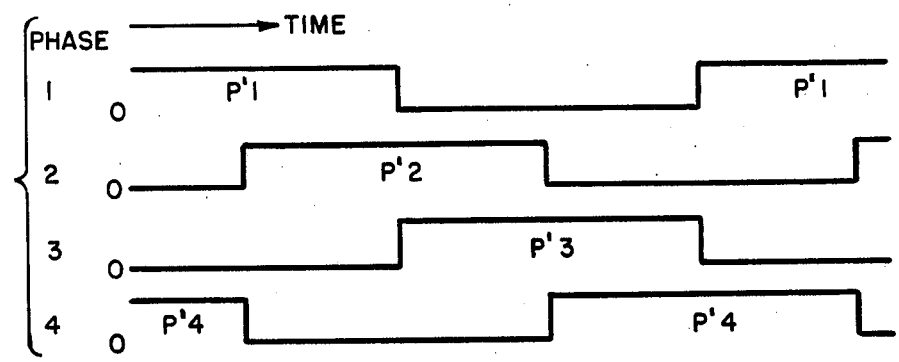

FIG. 3 shows the waveforms associated with dual phase operation. In this case at least two phases are always energized simultaneously. For example, while switch SW-1 is ON causing the energization of coils 21 and 21' as represented by drive pulse P'1 of the waveform of phase 1, switch SW-2 is closed generating drive pulse P'2 and energizing coils 22 and 22' so that both phases (1 and 2) are being driven simultaneously. Subsequently when switch SW-1 is turned OFF ending pulse P'1, switch SW-3 is simultaneously turned ON forming pulse P'3 which is maintained throughout the remainder of the energization of coils 22 and 22' (pulse P'2). Subsequently, while P'3 is ON, coils 24 and 24' are energized by the closure of switch SW-4 producing drive pulse P'4 at the termination of pulse P'2. As this continues two phases of the stator are energized at all times. It is obvious that since the torque produced by a previously energized phase, such as phase 1, will continue during the buildup of current in the newly energized phase, such as phase 2 (pulse P'2), the torque characteristics of the dual phase operation are significantly better than the single phase operation of FIG. 2. However, it is also evident that since the voltage is applied simultaneously to two phases at all times, a significant power consumption is the price paid for this increased torque characteristic because current is always drawn by two phases.

Figure 4:
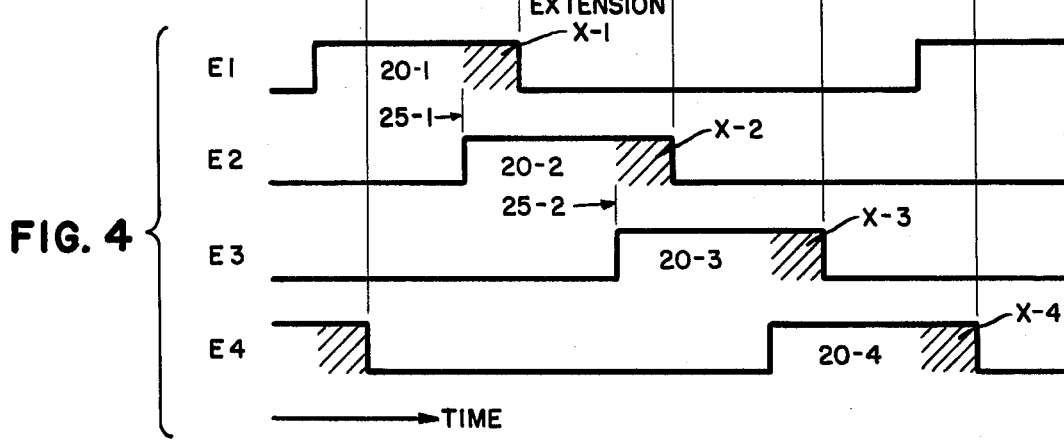
FIG. 4 illustrates waveforms representative of the driving pulses when operating a stepping motor in accordance with the present invention.

FIG. 4 illustrates representative waveforms of drive pulses for operating a stepping motor in accordance with the present invention. In particular, the drive pulse for each phase, such as 20-1 for phase 1, extends beyond the normal termination 25-1, for the single phase operation and extends into the time slot of the succeeding phase, but it terminates prior to the time 25-2, the end of the time slot dedicated to the second or subsequent phase (hence prior to the turn-ON of the next subsequent phase such as pulse 20-3 for phase 3). As will be explained hereinafter in greater detail, this extension or overlap represented by X-1, X-2, X-3, and X-4 greatly reduces the lost efficiency (due to acceleration and deceleration while current is being built up and decayed in the stator coils) since the existing torque is maintained by the continued excitation of the previously energized coil while the newly energized coil current is built up. However, since the drive pulses of successive phases are not maintained in their energized state perpetually and, in fact, two phases are energized only for a short portion of the overall time, the lost power due to common energization of two phases (as in dual phase excitation) is minimized.

In summary, operation in accordance with the present invention utilizes the best characteristics of both the single phase and dual phase modes of operation and minimizes the disadvantages of both.

Figure 5:
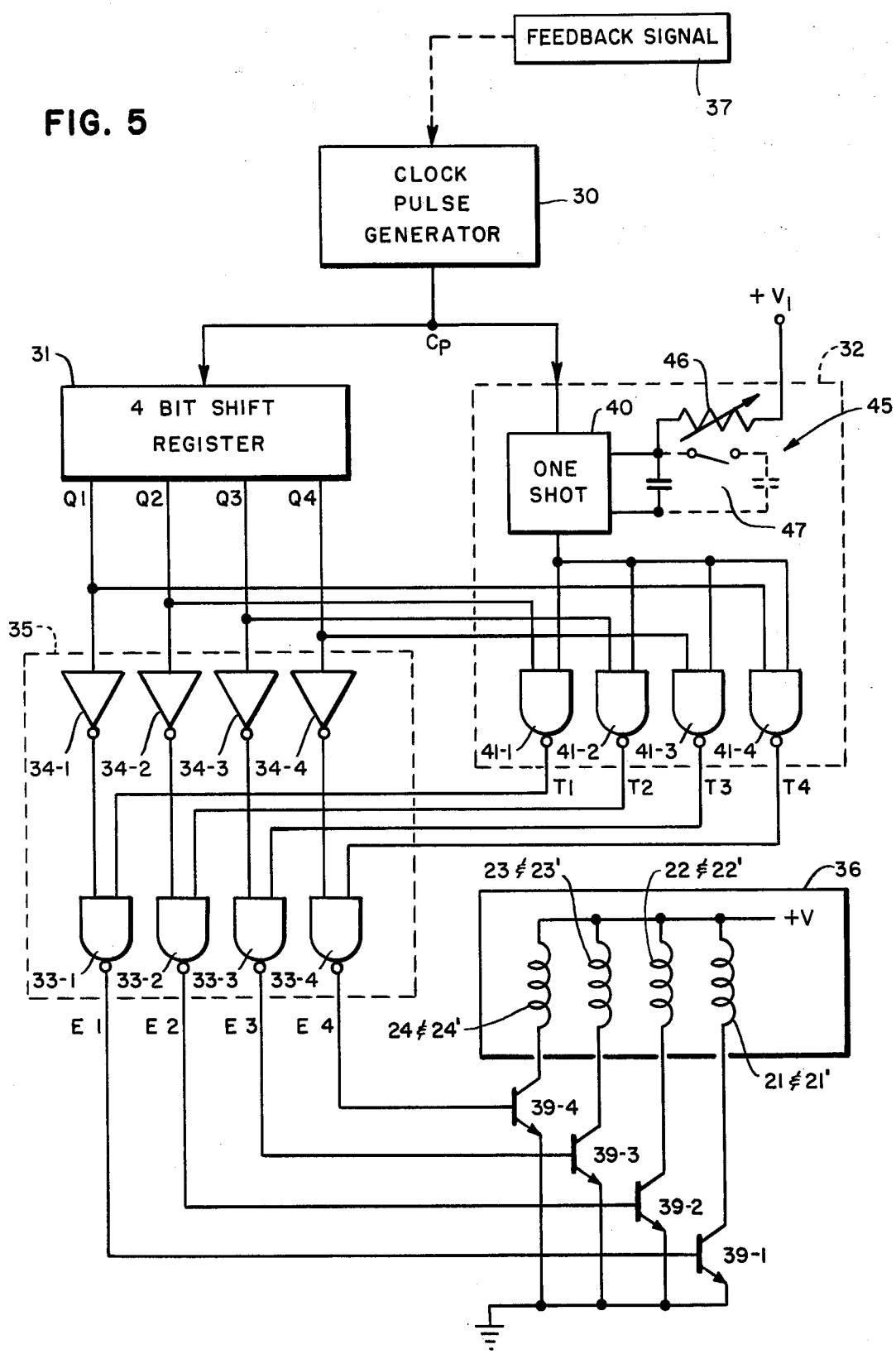
FIG. 5 is a schematic diagram of one embodiment of a driving circuit in accordance with the present invention.

FIG. 5 is a schematic representation of a drive circuit utilizing discrete components suitable for generation of the extended drive pulses necessary for the operation in accordance with the waveforms of FIG. 4. However, other circuit configurations, as well as micro-processors which lend themselves to move complex, time variable pulse extension in more sophisticated systems, may also be used. In essence, the motor drive 36 contains the stator coils 21 through 24 and their interconnected mates 21' through 24' (in FIG. 1), and the remainder of the circuit of FIG. 5 serves as the switches SW-1 through SW-4 (in FIG. 1) and the appropriate timing and control 16 (in FIG. 1) for these switches. A clock signal $C_p$ (generated by clock pulse generator 30) is fed simultaneously into a 4 bit shift register 31 and a pulse extender 32. The shift register 31 develops for every four pulses of clock signal $C_p$, four output pulses 18-1, 18-2, 18-3, and 18-4 sequentially distributed over the four output terminals Q1, Q2, Q3, and Q4. The pulse extender 32, which may be a monostable multivibrator 40 (commonly referred to as a one-shot) and a series of NAND-gates 41-1 through 41-4, develops, for every clock pulse, output pulses such as 19-1, 19-2, 19-3, and 19-4 which are sequentially distributed over four output terminals T1, T2, T3, and T4. The pulses 18 and 19 are combined in a logic combiner 35 to produce the desired drive pulses 20 which are used to control energization of the individual coils (phases) of motor drive 36.

Figure 6:
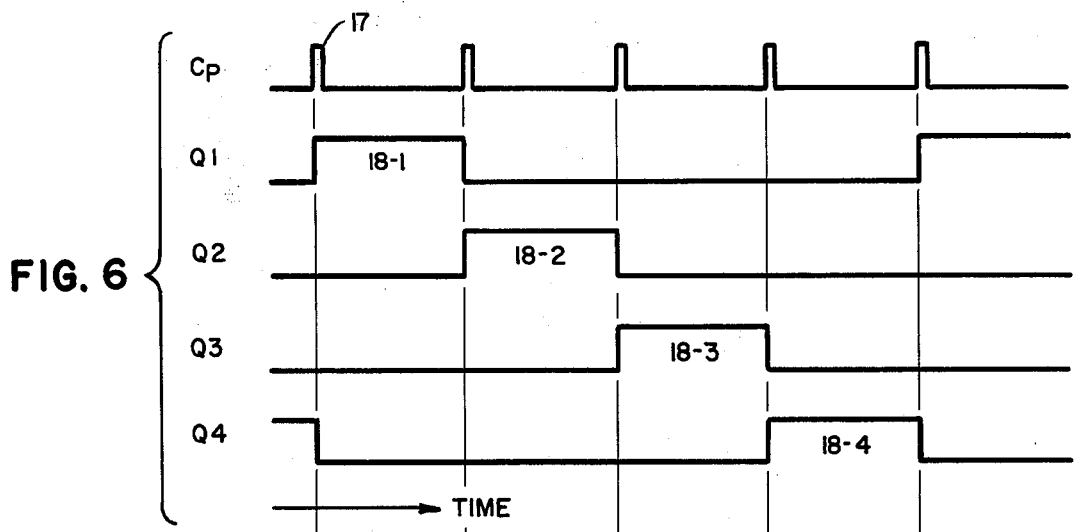
FIGS. 6 and 7 illustrate waveforms produced at various points in the circuit of FIG. 5.

In an N-phase motor, one step cycle occurs for every N clock pulses. Thus, in a four phase motor, one step cycle requires four clock pulses. In the preferred embodiment for producing these drive pulses 20 for a four phase motor, the shift register 31 is a standard device having four stages, one for each motor phase. For example, it may be a 4 bit shift register, such as is marketed as part number 9300 by Fairchild Semiconductor of Mountain View, Calif. Its stages are arranged in a continuous loop with one output terminal connected to each stage. One stage is initially loaded with an "ON" pulse, and this "ON" pulse is then stepped from stage to stage, one stage at a time, for each clock pulse 17 of clock signal $C_p$. Thus, as the "ON" pulse is stepped, an output pulse 18 is produced at each of the terminals Q1 through Q4. In one cycle (4 steps) one pulse 18 is sequentially produced at each terminal. These pulses 18 are assumed to be positive ("1" a high state defining the "ON" pulse) and are shown in FIG. 6. Thus, each of the pulses 18-1 through 18-4 exists (at its respective output Q1 through Q4), in its sequential time slot for one quarter of the step cycle, and each is synchronized with one of the clock pulses 17 (also shown in FIG. 6).

Figure 7:
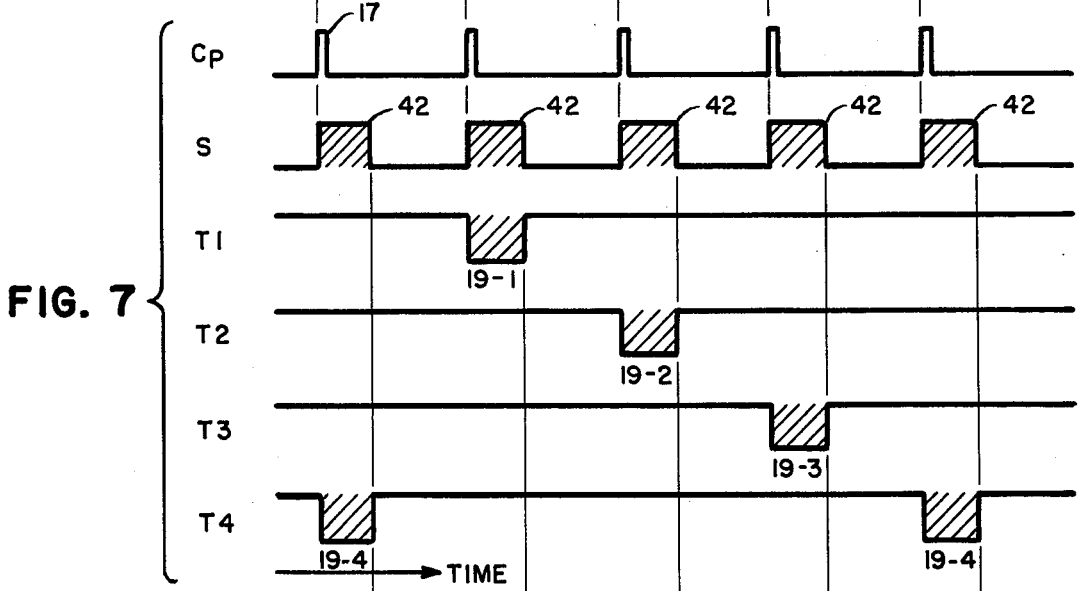

The pulse extender 32 is built around a one shot 40, which may be a commercially available integrated circuit device, such as part number SN 74123 marketed by T. I. Corporation. The one shot produces a pulse 42 of selected width for each clock pulse 17. This series of pulses, designated S, is shown in FIG. 7 along with the clock signal $C_p$ to which it is synchronized. The time duration (width) of the pulses 42 from the one shot 40 is determined by an RC network 45 which is connected to appropriate pins of the one shot device and to a bias voltage designated $+V_1$. Altering the RC time constant of network 45, such as by changing the value of the resistance 46 and/or the effective capacitance 47 (by connecting more or fewer parallel capacitors), changes the selected width of the one shot pulses 42.

These pulses 42 are applied to each of four two-input NAND-gates 41-1 through 41-4. The other input to each NAND-gate 41 is one of the quarter cycle pulses 18 shown in FIG. 6. The one shot 40 is assumed to produce a positive pulse 42 ("1" or high state defining the "ON" pulse), and therefore the output of each gate 41 will be a signal having only one negative pulse every four clock pulses. These negative pulses are shown in FIG. 7 as 19, and one will appear at the output of each gate (corresponding terminals T) during the coincidence of the pulse 42 and the specific pulse 18 connected to that gate. These negative pulses will be staggered in time, and as can be seen from the waveforms of FIGS. 6 and 7, the specific pulse 19 produced by the coincidence of pulse 42 and the quarter cycle pulse 18-1 is designated 19-4, while the pulses 19-1, 19-2, and 19-3 are produced respectively in response to pulses 18-2, 18-3, and 18-4. Hence, the outputs Q1, Q2, Q3, and Q4 of the register 31, are connected respectively to NAND-gates 41-4, 41-1, 41-2, and 41-3.

As the extension of the drive pulses 20 is a direct function of the pulses 19, these negative pulses are hereinafter referred to as extension pulses amd the width of pulses 42 is established so that each of the pulses 19 is of a duration less than the quarter cycle time slot occupied by each of the pulses 18. Network 45 may, of course, be adjusted to provide either fixed or variable extension for a given application. As will be discussed hereinafter a fixed extension is often preferred in closed loop systems; whereas, variable duration extensions are often better suited to open loop systems. It is also noted that the extension provided for different phases can be made different simply by appropriately timed changes of the time constant of network 45.

Pulses 18 at the terminals Q1 through Q4 of register 31 and the corresponding extension pulses 19 at the terminals T1 through T4 are combined in the logic combiner 35 in proper phase relation to form the four extended drive pulses 20-1 through 20-4, each at the respective outputs E1 through E4. The combiner 35 simply adds the extension pulse 19 to the end of the preceding quarter cycle pulse 18; that is, the quarter cycle pulse 18 is combined with the extension pulse 19 whose leading edge occurs at the same time as the trailing edge of the pulse 18. Thus, pulse 18-1 is extended by the addition of (an inverted) pulse 19-1 to form the extended drive pulse 20-1 and output E1. Similarly, extended drive pulses 20-2, 20-3, and 20-4 are formed at their respective outputs from the combination of corresponding quarter cycle pulses 18 and extension pulses 19. Given the polarities assumed, logic combiner 35 includes inverters 34-1 through 34-4 each inverting one of the quarter cycle pulses 18. These inverted quarter cycle pulses are each applied to one input of a two input NAND-gate 33-1 through 33-4. The other input to each NAND-gate is the corresponding output pulse 19 from the extender 32. For example, the pulse 18-1 is inverted and applied to NAND-gate 33-1 along with pulse 19-1. The output is the extended pulse 20-1 which is then applied to a transistor switch 39-1 which connects coils 21 and 21' of the stepping motor between a voltage +V and a reference voltage or ground, thereby energizing this first phase for the duration of the extended pulse 20-1. The remaining extended drive pulses 20-2 through 20-4 are similarly produced and applied to their respective switches 39-2 through 39-4, causing energization of stator coils 22-21' through 24-24', respectively.

As can be seen in FIG. 4, the resulting extended drive pulses 20 are each extended (by the width of pulse 19) into the next quarter cycle time slot. This overlap provides the continuation of torque from the last energized phase while the next energized phase is being turned ON. Hence, the motor does not suffer periodic decelerations, and accelerations as each phase excitation is switched ON and OFF. However, the extended pulse 20 does not extend throughout the next quarter cycle time slot and therefore the periods of dual energization are minimized, resulting in economy of power. The actual duration of overlap for any specific application will of course depend upon its characteristics and it is assumed that the extension (the width of pulse 19) will be established accordingly.

As indicated hereinbefore, stepping motors can be operated in two alternative modes. An open loop system, which is generally preferred because of the simplicity of its drive circuitry, requires a clock source, a shift register and a power drive circuit, such as is shown generally as 30, 31, and 36 in FIG. 5. In the simplest open loop systems using single phase excitation, the motor indexes whenever a clock pulse is applied to switch excitation from one phase to another. The clock frequency is fixed and the ultimate speed of the motor is inherently limited to less than the motor slew speed, which is defined as that speed at which the motor cannot accelerate (or decelerate) to the clock frequency without missing a step. While this limited operating range of the open loop system may be extended by ramping the drive pulses (expanding the time of one or more pulses by altering the clock frequency) at the beginning and end of the drive pulse sequence, the attainable speed is inherently lower than the slew speed possible with a closed loop system. Of course, with dual phase excitation, increased torque is available and this permits a substantial increase of speed. However, the dual phase excitation requires a substantial increase in power supply requirements.

Relative to open loop systems, a closed loop system is capable of much higher operating speeds. This is accomplished by monitoring the position or speed of the rotor and using this information to energize the various stator coils at the precisely proper times. Most conventionally the rotor position is sensed by a sensor-encoder mounted on the motor shaft. The signals produced by the encoder are fed back to the drive circuit to switch the energization from one phase to another, such as by controlling the output of a clock pulse generator 30 (in FIG. 5) as represented by feedback signal 37. The feedback signal is thus constantly adjusted to provide maximum torque and hence maximum speed.

In most applications where minimizing the time to traverse a specified distance is critical, the closed loop mode is used because it can achieve the greatest slew speed. However, the pulse extension of the present invention provides increased torque for both open and closed loop systems and this improvement is accomplished without excessive power consumption.

Figure 8A:
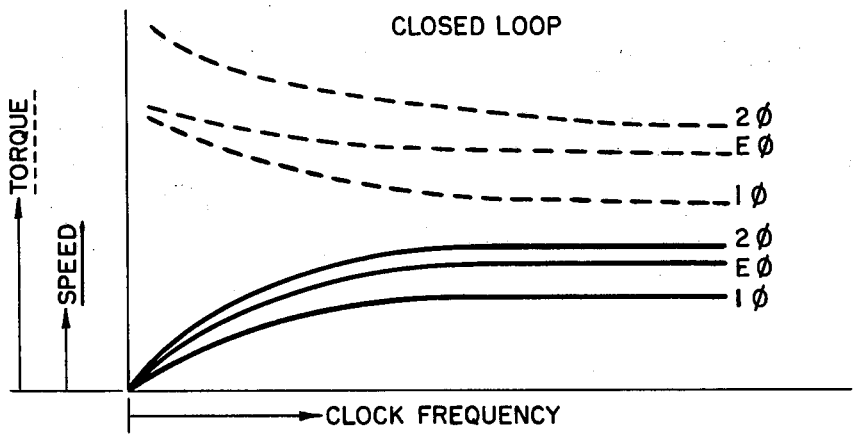
FIGS. 8A, 8B, 9A, and 9B are graphical illustrations of the advantageous characteristics of operation in accordance with the present invention.
Figure 8B:
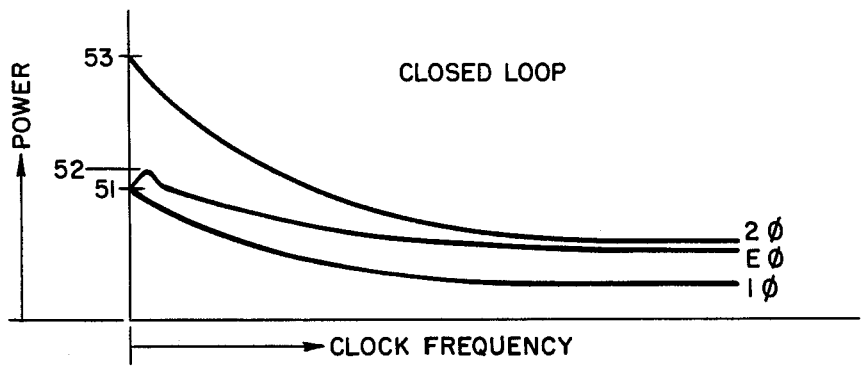

In closed loop systems the extension X is preferably, but not necessarily, of a fixed duration. For example, the extension may be fixed at 300 microseconds and, during acceleration, the drive pulses 20 may be approximately 3 to 4 milliseconds. The torque of the motor at this slow stepping rate is more than adequate to accelerate the inertial load and the pulse extension is less than 10% of the total drive pulse 20. Hence as shown in FIG. 8B, the extended single phase excitation (Eφ) requires only a maximum power level 52, which is minimally greater than the power supply capacity 51 required for single phase excitation (1φ), whereas the dual phase excitation (2φ) would require a capacity 53, double that of the single phase excitation. In fact dual phase operation produces approximately 140% of single phase torque while it consumes twice the power.

As the system accelerates, the clock frequency (rate of pulses 17) is increased automatically in response to feedback signal 37 from the encoder-sensor. Accordingly, the pulse extension becomes an increasingly significant portion of the drive pulses 20. For example, at slew speed, the pulse 20 may be approximately 700 microseconds (approximately 20% of the pulse width during acceleration) so that the fixed pulse extension of 300 microseconds is approximately 43% of the total pulse width. This of course maintains the motor output torque at levels much higher than for the single phase excitation as shown in FIG. 8A. In fact the torque produced at high speeds rapidly approaches that of the dual phase excitation and accordingly the resultant slew speed also approaches that produced by dual phase excitation.

The pulse extension, and in particular, the fixed duration pulse extension provides increased slew speed in a closed loop system without significantly increasing the power supply requirements (maximum power levels 51, 52, and 53) as shown in FIG. 8. At low speeds when maximum torque is available (due to the large drive pulse width) and required to accelerate the load, maximum power is consumed. However, increasingly less torque is required as the load accelerates, and as the step (clock) frequency increases, a higher slew speed is attained as a result of the higher torque produced (due to the continually increasing percentage of extended pulse time). Advantageously this increasing overlap occurs when excess power is available from the power supply.

The extension may not be of a fixed duration is some applications. In fact, in some complex closed loop systems, there may be no extension at the motor start up, but as the system speeds up, larger and larger pulse extensions may be provided.

Open loop systems do not use automatic adjustment of the step frequency as described above. The clock frequency is fixed, and the application of the extended single phase excitation to such systems is therefore somewhat different. Nevertheless, the incorporation of pulse extension provides more torque (and hence extends the operating range) than is available from single phase excitation and may replace the need for ramping or, if used with ramping, further increases the operating range. Hereinafter the effects of ramping will be ignored since the operation and advantages of extended single phase excitation are applicable equally to systems operating with and without ramping.

Figure 9A:
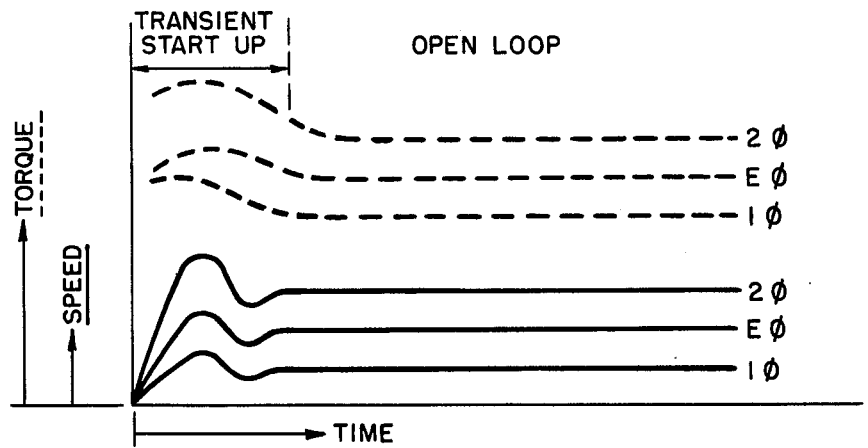
Figure 9B:
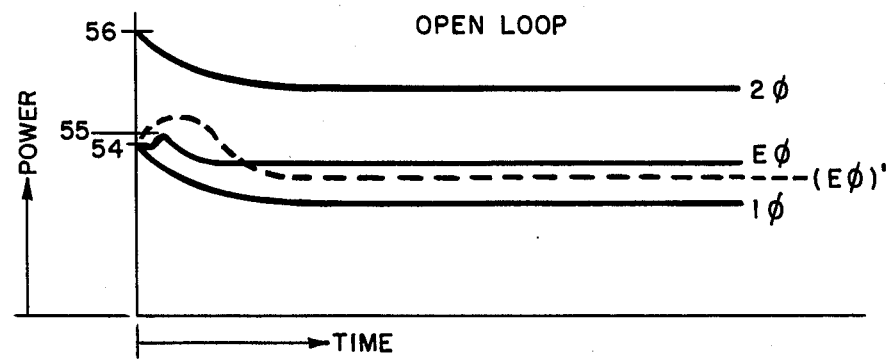

FIGS. 9A and 9B illustrate the advantages of extended single phase excitation in an open loop system. The extension (X in FIG. 4) is first assumed to be of a fixed duration. The step frequency (rate of pulses 17) is constant, and as can be seen in FIG. 9A after increasing during the transient start-up of the motor, the torque for single, dual and extended single phase excitations 1φ, 2φ, and Eφ, respectively, stabilize at constant levels. Similarly, the speed increases and after minor oscillation, stabilizes at a constant slew speed. As can be seen in FIG. 9B, the significantly increased torque and speed, shown in FIG. 9A to be provided by extended phase excitation, does not require significantly larger power supply capacity. The maximum power requirement 55 for extended phase operation is only slightly higher than that required (54) for single phase excitation but always considerably lower than the requirement 56 for dual phase excitation, which is twice that of the single phase excitation.

A further improvement can be achieved by varying the pulse extension on a time dependent basis. This technique enables the motor to be best matched with the dynamic load characteristics. Preferably long pulse extension should be provided during starting and stopping when load requirements are greatest and small extension (or none at all) during constant speed operation. The effect is to significantly reduce the power consumption during constant speed operation. The power spectrum for an extended single phase operation with otimized variation of the extension is designated (Eφ)' in FIG. 9B. Sometimes pulse extension is completely eliminated during constant speed operation to further reduce power consumption; however, this is not always desirable since it does allow higher step rates to be achieved. In any event the required time-dependent variation of the extension can be accomplished by appropriately altering the characteristics of pulse extender 32 (such as by varying the time constant of the RC network 45 in FIG. 5).

In all cases it is to be understood that the above described arrangements are merely illustrative of a small number of the many possible applications of the principles of the present invention. Numerous and varied other arrangements in accordance with these principles may readily be devised by those skilled in the art without departing from the spirit and scope of the invention.

What is claimed is:

1. A method for operating a stepping motor having a plurality of individually energizable phases comprising the steps of:

sequentially energizing each of a plurality of phases for distinctive intervals of time;

the energization interval of each one of the phases overlapping in time with the energization interval of the phase first subsequent thereto for a selected overlap period, the selected overlap period being such that the energization interval of the one phase terminates a selected time prior to the energization of the next subsequent one of the plurality of phases; and wherein the selected overlap period for a given phase is of a fixed duration and the energization interval for that phase is variable in duration.

2. A method for operating a stepping motor having a plurality of individually energizable phases comprising the steps of:

sequentially energizing each of a plurality of phases for distinctive intervals of time;

the energization interval of each one of the phases overlapping in time with the energization interval of the phase first subsequent thereto for a selected overlap period, the selected overlap period being such that the energization interval of the one phase terminates a selected time prior to the energization of the next subsequent one of the plurality of phases; and wherein the selected overlap period for a given phase is variable in duration and the energization interval for that phase is of a fixed duration.

3. A multiphase stepping motor having a plurality of individually energizable phases comprising:

means for selectively energizing each of the phases in response to a drive pulse, each drive pulse having three successive portions;

said energizing means including timing means for establishing the delineation between the three portions of each drive pulse so that during a first portion of each drive pulse one other drive pulse for one other phase exists simultaneously, during the second portion of each drive pulse; drive pulses for none of the other phases exist, and during the third portion of each drive pulse a second other drive pulses for a second other phase exists simultaneously; and wherein the timing means provides a series of drive pulses for each phase and the third portions of all pulses in each series is of a fixed duration and the total duration of each pulse of each series is variable.

4. A multiphase stepping motor having a plurality of individually energizable phases comprising:

means for selectively energizing each of the phases in response to a drive pulse, each drive pulse having three successive portions.

said energizing means including timing means for establishing the delineation between the three portions of each drive pulse so that during a first portion of each drive pulse one other drive pulse for one other phase exists simultaneously, during the second portion of each drive pulse; drive pulses for none of the other phases exist, and during the third portion of each drive pulse a second other drive pulse for a second other phase exits simultaneously; and wherein the timing means provides a series of drive pulses for each phase and the third portion of all pulses in each series is of a variable duration and the total duration of each pulse of each series is fixed.

5. A multiphase stepping motor having a plurality of individually energizable phases comprisng:

means for selectively energizing each of the phases in response to a drive pulse, each drive pulse having three successive portions;

said energizing means including timing means for establishing the delineation between the three portions of each drive pulse so that during a first portion of each drive pulse one other drive pulse for one other phase exists simultaneously, during the second portion of each drive pulse; drive pulses for none of the other phases exist, and during the third portion of each drive pulse a second other drive pulse for a second other phase exists simultaneously; and wherein the motor further includes feedback means for controlling the energization times of the various phases, and wherein the third portion of each drive pulse is of a fixed duration and the feedback drive pulse widths are variable, the relative portion of the third portion of each drive pulse being varied in response to the control provided by the feedback means.

6. In a stepping motor having N phases each being energized once for each step cycle, a drive circuit comprising:

means for generating N distinct phasal signals each phasal signal consisting of a series of phasal pulses having a pulse width substantially equal to a 1/N of the step cycle, means for generating N distinctive extension signals, each extension signal consisting of a series of extension pulses having a pulse width substantially less than 1/N of the pulse cycle, means for generating a clock signal, means for combining corresponding ones of the phasal signals and the extension signals in synchronism with the clock signal to produce the N drive signals, each drive signal including a series of drive pulses having a pulse width which is the sum of the pulse width of a phasal signal pulse and an extension signal pulse, drive pulses of each of the N drive signals commencing in sequence and each drive pulse of one of the N drive signals overlapping the drive pulse of the next sequential drive signal by the width of its corresponding extension pulse; and means for applying each of the N drive signals to a corresponding one of the N phases of the drive motor.

7. In a stepping motor, a drive circuit as claimed in claim 6 wherein the drive circuit further includes means interacting with the extension signal generating means for varying the widths of the extension pulses.

8. In a stepping motor, a drive circuit as claimed in claim 6 wherein the clock signal generating means produces a clock signal of fixed frequency and the drive circuit further includes means interacting with the extension signal generating means for varying the width of the extension pulses.

9. In a stepping motor, a drive circuit as claimed in claim 6 wherein the phased signal generating means includes an N stage shift register.

10. In a stepping motor having N phases each being energized once for each step cycle, a drive circuit comprising:

means for generating N distinct phasal signals each phasal signal consisting of a series of phasal pulses having a pulse width substantially equal to a 1/N of the step cycle;

means for generating N distinctive extension signals, each extension signal consisting of a series of extension pulses having a pulse width substantially less than 1/N of the pulse cycle;

means for generating a clock signal;

means for combining corresponding ones of the phasal signals and the extension signals in synchronism with the clock signal to produce the N drive signals, each drive signal including a series of drive pulses having a pulse width which is the sum of the pulse width of a phasal signal pulse and an extension signal pulse, drive pulses of each of the N drive signals commencing in sequence and each drive pulse of one of the N drive signals overlapping the drive pulse of the next sequential drive signal by the width of its corresponding extension pulse;

means for applying each of the N drive signals to a corresponding one of the N phases of the drive motor; and feedback means interacting with the clock signal generating means for controlling the frequency of the clock signal.

11. In a stepping motor, a drive circuit as claimed in claim 10 wherein the extension signal generating means maintains a fixed pulse width for all of the extension pulses on each of the N extension signals.

12. In a stepping motor having N phases each being energized once for each step cycle, a drive circuit comprising:

means for generating N distinct phasal signals each phasal signal consisting of a series of phasal pulses having a pulse width substantially equal to a 1/N of the step cycle;

means for generating N distinctive extension signals, each extension signal consisting of a series of extension pulses having a pulse width substantially less than 1/N of the pulse cycle, wherein the pulse width of the extension pulses of at least one of the N extension signals is different from the pulse width of the pulses of the other extension signals;

means for generating a clock signal;

means for combining corresponding ones of the phasal signals and the extension signals in synchronism with the clock signal to produce the N drive signals, each drive signal including a series of drive pulses having a pulse width which is the sum of the pulse width of a phasal signal pulse and an extension signal pulse, drive pulses of each of the N drive signals commencing in sequence and each drive pulse of one of the N drive signals overlapping the drive pulse of the next sequential drive signal by the width of its corresponding extension pulse, and means for applying each of the N drive signals to a corresponding one of the N phases of the drive motor.

13. In a stepping motor having N phases each being energized once for each step cycle, a drive circuit comprising:

means for generating N distinct phasal signals each phasal signal consisting of a series of phasal pulses having a pulse width substantially equal to a 1/N of the step cycle;

means for generating N distinctive extension signals, including a one-shot device each extension signal consisting of a series of extension pulses having a pulse width substantially less than 1/N of the pulse cycle, and means interacting with the one-shot device for selectively establishing the pulse width of each extension pulse;

means for generating a clock signal;

means for combining corresponding ones of the phasal signals and the extension signals in synchronism with the clock signal to produce the N drive signals, each drive signal including a series of drive pulses having a pulse width which is the sum of the pulse width of a phasal signal pulse and an extension signal pulse, drive pulses of each of the N drive signals commencing in sequence and each drive pulse of one of the N drive signals overlapping the drive pulse of the next sequential drive signal by the width of its corresponding extension pulse, and means for applying each of the N drive signals to a corresponding one of the N phases of the drive motor.

14. In a stepping motor having N phases each being energized once for each step cycle, a drive circuit comprising:

means for generating N distinct phasal signals each phasal signal consisting of a series of phasal pulses having a pulse width substantially equal to a 1/N of the step cycle;

means for generating N distinctive extension signals, each extension signal consisting of a series of extension pulses having a pulse width substantially less than 1/N of the pulse cycle, means for generating a clock signal;

means for combining corresponding ones of the phasal signals and the extension signals in synchronism with the clock signal to produce the N drive signals, each drive signal including a series of drive pulses having a pulse width which is the sum of the pulse width of a phasal signal phase and an extension signal pulse, drive pulses of each of the N drive signals commencing in sequence and each drive pulse of one of the N drive signals overlapping the drive pulse of the next sequential drive signal by the width of its corresponding extension pulse;

means for applying each of the N drive signals to a corresponding one of the N phases of the drive motor; and feedback means for variably controlling the width of the phasal pulses.

* * * * *